(12) United States Patent
Huang et al.

(10) Patent No.: US 11,775,030 B2
(45) Date of Patent: *Oct. 3, 2023

(54) PORTABLE ELECTRONIC DEVICE

(71) Applicant: Acer Incorporated, New Taipei (TW)

(72) Inventors: Pao-Min Huang, New Taipei (TW); Tzu-Wei Lin, New Taipei (TW); Chih-Chun Liu, New Taipei (TW); Cheng-Nan Ling, New Taipei (TW); Wen-Chieh Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,961

(22) Filed: Sep. 7, 2022

(65) Prior Publication Data

US 2022/0413564 A1  Dec. 29, 2022

Related U.S. Application Data

(63) Continuation of application No. 17/356,488, filed on Jun. 23, 2021, now Pat. No. 11,474,569.

(51) Int. Cl.
*G06F 1/16* (2006.01)

(52) U.S. Cl.
CPC .................. *G06F 1/1681* (2013.01)

(58) Field of Classification Search
None
See application file for complete search history.

(56) References Cited

U.S. PATENT DOCUMENTS

| | | | | |
|---|---|---|---|---|
| 6,530,784 | B1 * | 3/2003 | Yim | G06F 1/1679 439/31 |
| 11,079,810 | B2 * | 8/2021 | Bir | E05D 11/0081 |
| 11,474,569 | B2 * | 10/2022 | Huang | G06F 1/1683 |

\* cited by examiner

*Primary Examiner* — Anthony Q Edwards
*Assistant Examiner* — Rashen E Morrison
(74) *Attorney, Agent, or Firm* — JCIPRNET

(57) ABSTRACT

A portable electronic device includes a first body, a second body, a hinge mechanism, a spring, and a cable extending from the first body to the second body. The second body is connected to the first body through the hinge mechanism. The first body has a first pillar, a second pillar, and a third pillar. The second pillar is located between the first pillar and the third pillar. The spring is disposed in the first body as corresponding to the second pillar. The cable includes a first winding segment extending through a gap between the first pillar and the second pillar, a second winding segment extending through a gap between the second pillar and the spring, and a third winding segment extending through a gap between the second pillar and the third pillar. Two ends of the spring are respectively connected to the first body and the second winding segment.

18 Claims, 9 Drawing Sheets

PORTABLE ELECTRONIC DEVICE

CROSS-REFERENCE TO RELATED APPLICATION

This application is a continuation application of and claims the priority benefit of U.S. application Ser. No. 17/356,488, filed on Jun. 23, 2021, now allowed, which claims the priority benefit of Taiwan application serial no. 110101421, filed on Jan. 14, 2021. The entirety of each of the above-mentioned patent applications is hereby incorporated by reference herein and made a part of this specification.

BACKGROUND

Technical Field

The disclosure relates to an electronic device, and more particularly to a portable electronic device.

Description of Related Art

Since a notebook computer has the features of high computing performance, multi-tasking, and portability, it has become an indispensable tool for a modern person in life or work. In general, a notebook computer includes a first body responsible for logic operations and data access and a second body responsible for displaying images, and the second body is pivotally connected to the first body to rotate and open with respect to the first body or to rotate and close with respect to the first body. In detail, the second body is electrically connected to the first body, and a cable extends from the first body to the second body. During the process of the second body rotating with respect to the first body, the cable is not only susceptible to being pulled and thereby causing the problem of tangling, but also incapable of automatically adjusting the expanding and contracting length with the opening and closing of the second body with respect to the first body.

SUMMARY

The disclosure provides a portable electronic device which not only can maintain the tension of a cable but also can prevent the problem of tangling when the cable expands and contracts.

The disclosure provides a portable electronic device which includes a first body, a second body, a hinge mechanism, a spring, and a cable. The second body is rotatably and slidably connected to the first body through the hinge mechanism. The first body has a first pillar, a second pillar, and a third pillar. The second pillar is located between the first pillar and the third pillar. The spring is disposed in the first body as corresponding to the second pillar. The cable extends from the first body to the second body. The cable includes a first winding segment, a second winding segment connected to the first winding segment, and a third winding segment connected to the second winding segment, and the first winding segment extends through a gap between the first pillar and the second pillar. The second winding segment extends through a gap between the second pillar and the spring, and the third winding segment extends through a gap between the second pillar and the third pillar. Two ends of the spring are respectively connected to the first body and the second winding segment.

Based on the above, in the portable electronic device of the disclosure, a cable management structure is disposed in the first body. The cable management structure includes the spring and the plurality of pillars, and the plurality of pillars define a winding route of the cable to prevent the problem of tangling when the cable expands and contracts. In addition, the spring serves to provide proper elasticity to the cable to maintain the tension of the cable, so that the cable can automatically adjust the expanding and contracting length with the opening and closing of the second body with respect to the first body.

In order to make the aforementioned features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
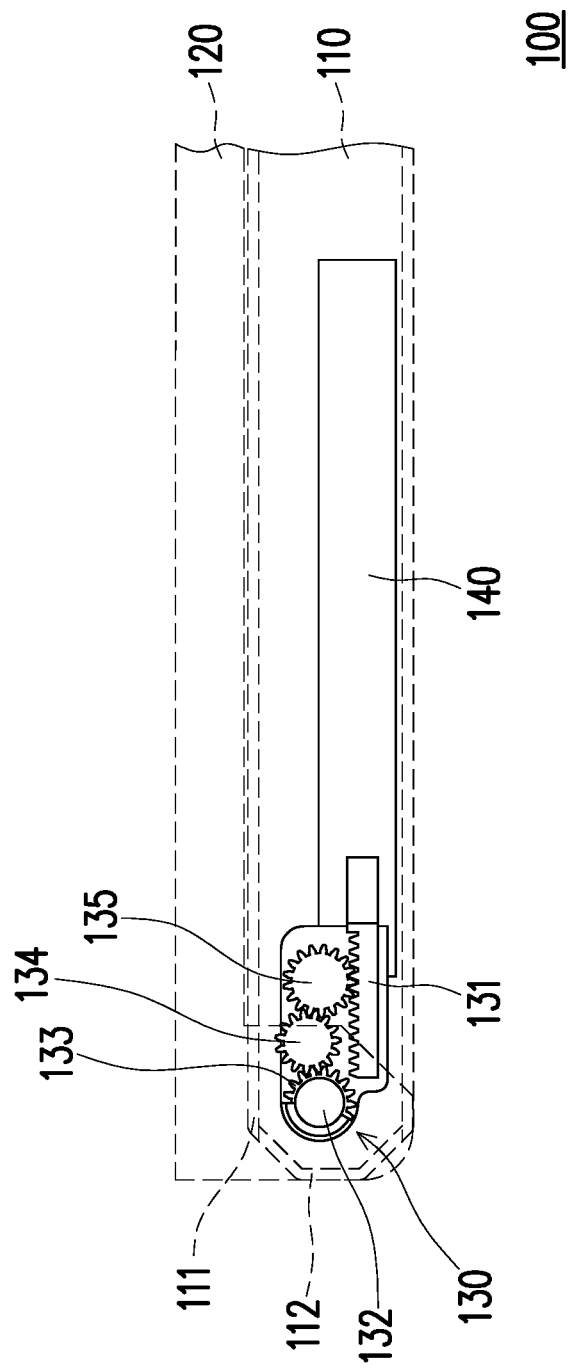
FIG. 1A is a schematic partial enlarged side view of a portable electronic device in a closed state according to the first embodiment of the disclosure.
Figure 1B:
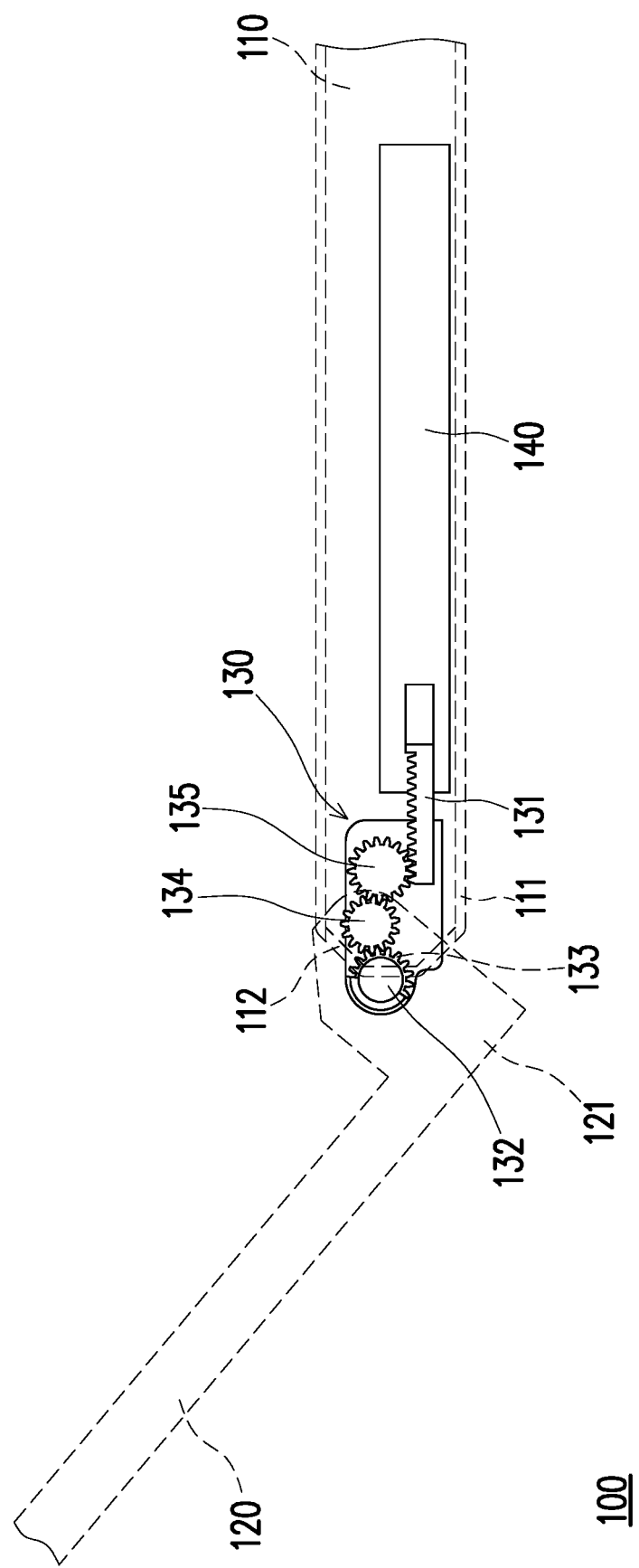
FIG. 1B is a schematic partial enlarged side view of a portable electronic device in an open state according to the first embodiment of the disclosure.
Figure 1C:
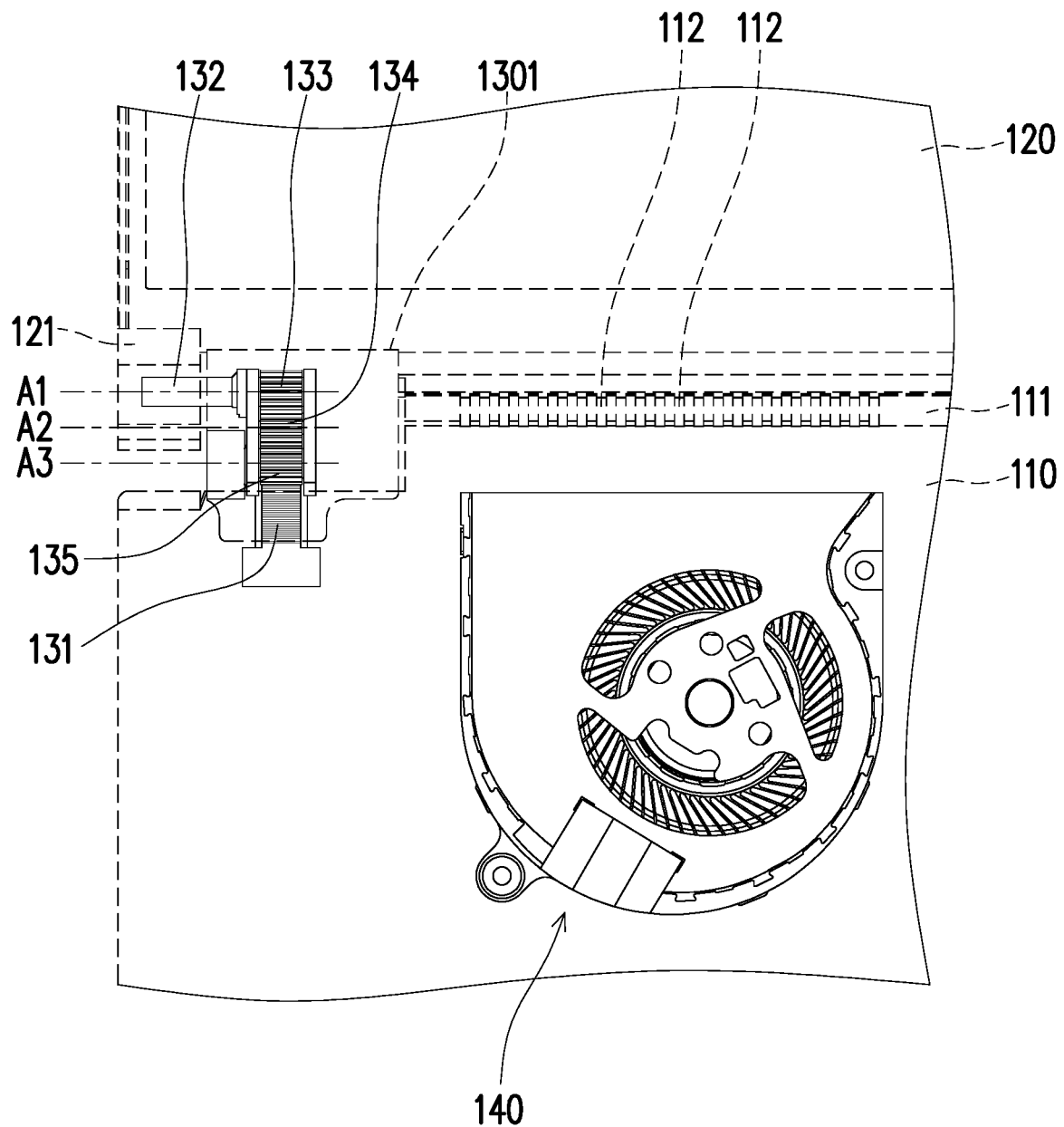
FIG. 1C is a schematic partial enlarged top view of FIG. 1B.

FIG. 1A is a schematic partial enlarged side view of a portable electronic device in a closed state according to the first embodiment of the disclosure. FIG. 1B is a schematic partial enlarged side view of a portable electronic device in an open state according to the first embodiment of the disclosure. FIG. 1C is a schematic partial enlarged top view of FIG. 1B. In particular, a first body 110, a second body 120, and a hinge cover 1301 are shown in dashed lines in the drawings to clearly show an internal structure configuration of the first body 110, the second body 120, and the hinge cover 1301.

Referring to FIG. 1A to FIG. 1C, in this embodiment, a portable electronic device 100 may be a notebook computer and includes the first body 110, the second body 120, and a hinge mechanism 130. The first body 110 is capable of logical operations and data access, and the second body 120 is capable of displaying images. The second body 120 is connected to the first body 110 through the hinge mechanism 130, and the hinge mechanism 130 provides a movement freedom for the second body 120 to rotate and slide with respect to the first body 110.

Furthermore, at the time when the second body 120 rotates with respect to the first body 110 through the hinge mechanism 130, the second body 120 slides with respect to the first body 110, and a horizontal displacement is generated. The first body 110 has a pivot side 111 and a heat dissipation hole 112 located on the pivot side 111, and a part of the hinge mechanism 130 is disposed on the first body 110 as corresponding to the pivot side 111. A lower edge 121 of the second body 120 is connected to the first body 110 through the hinge mechanism 130, and another part of the hinge mechanism 130 is disposed on the second body 120 as corresponding to the lower edge 121.

Referring to FIG. 1A to FIG. 1C, the hinge mechanism 130 includes a rack 131, a rotation shaft 132, and an actuator. The rack 131 is fixedly disposed in the first body 110 as corresponding to the pivot side 111, and an extending direction and an extending length of the rack 131 can serve to determine a sliding direction and a sliding stroke of the second body 120. The rotation shaft 132 is connected to the second body 120 to synchronously rotate and slide with the second body 120.

In the embodiment, the actuator includes a first spur gear 133, a second spur gear 134, and a third spur gear 135. The first spur gear 133 is connected to the rotation shaft 132, and a combination of the first spur gear 133 and the rotation shaft 132 may be a gear shaft. The first spur gear 133 is engaged with the second spur gear 134. The second spur gear 134 is engaged with the third spur gear 135, and the third spur gear 135 is engaged with the rack 131. For example, the hinge mechanism 130 may include the hinge cover 1301, and may serve to accommodate the rack 131, the rotation shaft 132, the first spur gear 133, the second spur gear 134, and the third spur gear 135. In addition, the rotation shaft 132 can be rotatably disposed in a penetrating manner in the hinge cover 1301, and the hinge cover 1301 can synchronously slide with the rotation shaft 132, the first spur gear 133, the second spur gear 134, the third spur gear 135, and the second body 120.

When the second body 120 rotates and opens with respect to the first body 110 through the hinge mechanism 130, the rotation shaft 132 and the first spur gear 133 rotate with the second body 120, and at the same time, the first spur gear 133 drives the second spur gear 134, and the second spur gear 134 drives the third spur gear 135. The second body 120, the rotation shaft 132, the first spur gear 133, and the third spur gear 135 rotate in a same direction, and the direction is opposite to a rotation direction of the second spur gear 134. In addition, the rotation shaft 132 and the first spur gear 133 rotate around a rotation axis A1, and the second spur gear 134 rotates around a rotation axis A2 parallel to the rotation axis A1, and the third spur gear 135 rotates around a rotation axis A3 parallel to the rotation axis A1.

Because the rack 131 is fixed, the rotating third spur gear 135 slides with respect to the rack 131 and drives the second spur gear 134, the first spur gear 133, the rotation shaft 132, and the second body 120 to synchronously slide.

Following the above, driven by the hinge mechanism 130, the second body 120 slides with respect to the first body 110, and slides away from the pivot side 111 of the first body 110 and the heat dissipation hole 112 located on the pivot side 111, so as to increase a distance between the lower edge 121 of the second body 120 and the heat dissipation hole 112. By increasing the distance between the lower edge 121 of the second body 120 and the heat dissipation hole 112, the heat dissipation hole 112 is not blocked by the lower edge 121 of the second body 120, so that the hot air in the first body 110 can be quickly exhausted to the outside through the heat dissipation hole 112, so the portable electronic device 100 has excellent heat dissipation efficiency.

In general, a fan 140 is disposed in the first body 110, and serves to forcibly exhaust heat generated by a heat source (e.g., a central processor, a graphics processor, or other electronic components) in the first body 110. Furthermore, hot air is formed after cold air in the first body 110 absorbs the heat generated by the heat source, and the hot air can be forcibly exhausted through the heat dissipation hole 112 when the fan 140 operates. After the second body 120 opens with respect to the first body 110, the lower edge 121 of the second body 120 moves away from the pivot side 111 of the first body 110, so as to provide a sufficient heat dissipation space around the heat dissipation hole 112, thereby accelerating a heat dissipation to another place.

The actuator of this embodiment is configured by three spur gears. In another embodiment, the actuator includes a spur gear. In still another embodiment, the actuator includes an odd number of spur gears, and the number is greater than three.

Figure 2A:
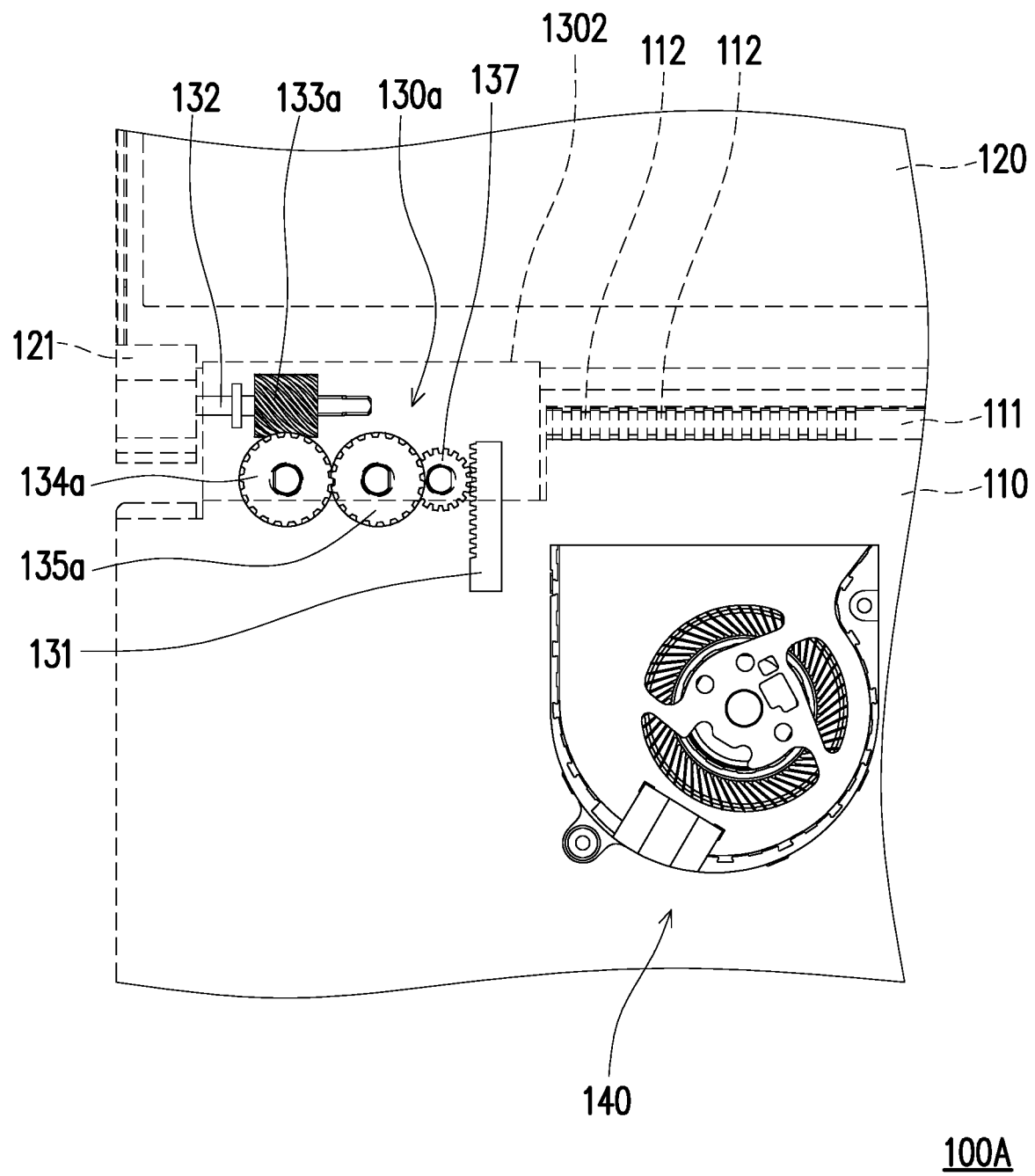
FIG. 2A is a schematic partial enlarged top view of a portable electronic device in an open state according to the second embodiment of the disclosure.
Figure 2B:
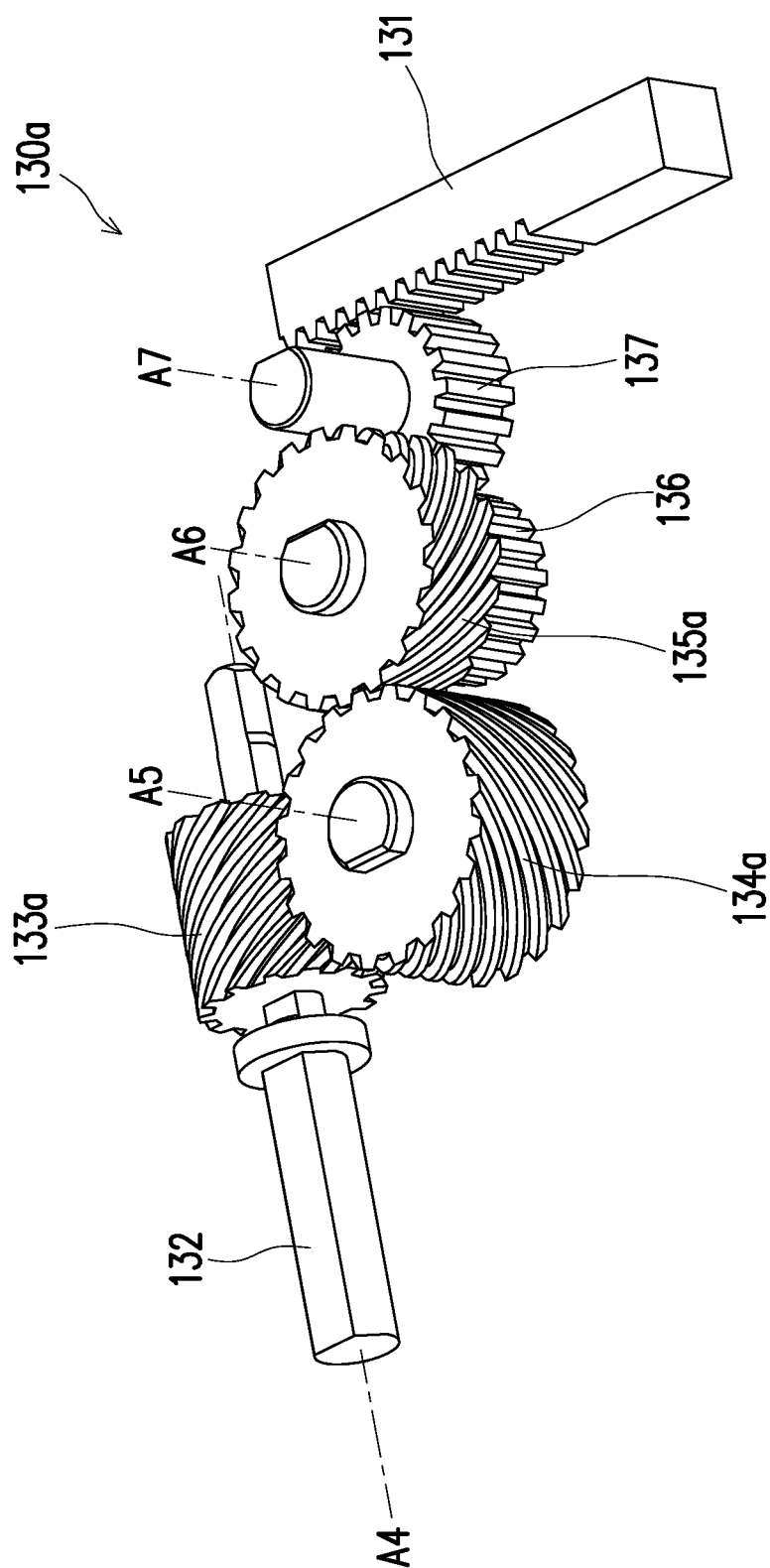
FIG. 2B is a schematic enlarged view of a hinge mechanism of FIG. 2A from another perspective.

FIG. 2A is a schematic partial enlarged top view of a portable electronic device in an open state according to the second embodiment of the disclosure. FIG. 2B is a schematic enlarged view of a hinge mechanism of FIG. 2A from another perspective. In particular, the first body 110, the second body 120, and a hinge cover 1302 are shown in dashed lines in the drawings to clearly show an internal structure configuration of the first body 110, the second body 120 and the hinge cover 1302.

Referring to FIG. 2A and FIG. 2B, a design principle of a portable electronic device 100A of this embodiment is similar to a design principle of the portable electronic device 100 of the first embodiment, and a main difference between the two is a structure type of the actuator. In the embodiment, the actuator includes a first helical gear 133a, a second helical gear 134a, a third helical gear 135a, a synchronous spur gear 136, and a driven spur gear 137. The first helical gear 133a is connected to the rotation shaft 132, and a combination of the first helical gear 133a and the rotation shaft 132 may be a gear shaft. The first helical gear 133a is engaged with the second helical gear 134a, and the second helical gear 134a is engaged with the third helical gear 135a. The synchronous spur gear 136 is disposed on the third helical gear 135a, and the third helical gear 135a and the synchronous spur gear 136 synchronously rotate. The synchronous spur gear 136 is engaged with the driven spur gear 137, and the driven spur gear 137 is engaged with the rack 131.

For example, the hinge mechanism 130a may include the hinge cover 1302, and may serve to accommodate the rack 131, the rotation shaft 132, the first helical gear 133a, the second helical gear 134a, the third helical gear 135a, the synchronous spur gear 136, and the driven spur gear 137. In addition, the rotation shaft 132 can be rotatably disposed in a penetrating manner in the hinge cover 1302, and the hinge cover 1302 can synchronously slide with the rotation shaft 132, the first helical gear 133a, the second helical gear 134a, the third helical gear 135a, the synchronous spur gear 136, the driven spur gear 137, and the second body 120.

When the second body 120 rotates and opens with respect to the first body 110 through the hinge mechanism 130a, the rotation shaft 132 and the first helical gear 133*a* rotate with the second body 120, and at the same time, the first helical gear 133*a* drives the second helical gear 134*a*, and the second helical gear 134*a* drives the third helical gear 135*a*. The synchronous spur gear 136 rotates with the third helical gear 135*a* and drives the driven spur gear 137. The second helical gear 134*a* and the driven spur gear 137 rotate in a same direction, and the direction is opposite to a rotation direction of the third helical gear 135*a* and the synchronous spur gear 136. In addition, the rotation shaft 132 and the first helical gear 133*a* rotate around a rotation axis A4, and the second helical gear 134*a* rotates around a rotation axis A5. The third helical gear 135*a* and the synchronous spur gear 136 rotate around a rotation axis A6, and the driven spur gear 137 rotates around a rotation axis A7. The rotation axes A5 to A7 are parallel to each other, and the rotation axis A4 is neither parallel nor perpendicular to the rotation axes A5 to A7.

Because the rack 131 is fixed, the rotating driven spur gear 137 slides with respect to the rack 131 and drives the synchronous spur gear 136, the third helical gear 135*a*, the second helical gear 134*a*, the first helical gear 133*a*, the rotation shaft 132, and the second body 120 to synchronously slide.

Following the above, driven by the hinge mechanism 130*a*, the second body 120 slides with respect to the first body 110, and slides away from the pivot side 111 of the first body 110 and the heat dissipation hole 112 located on the pivot side 111, so as to increase the distance between the lower edge 121 of the second body 120 and the heat dissipation hole 112. By increasing the distance between the lower edge 121 of the second body 120 and the heat dissipation hole 112, the heat dissipation hole 112 is not blocked by the lower edge 121 of the second body 120, so that the heat in the first body 110 can be quickly exhausted through the heat dissipation hole 112, so the portable electronic device 100A has excellent heat dissipation efficiency.

Figure 3A:
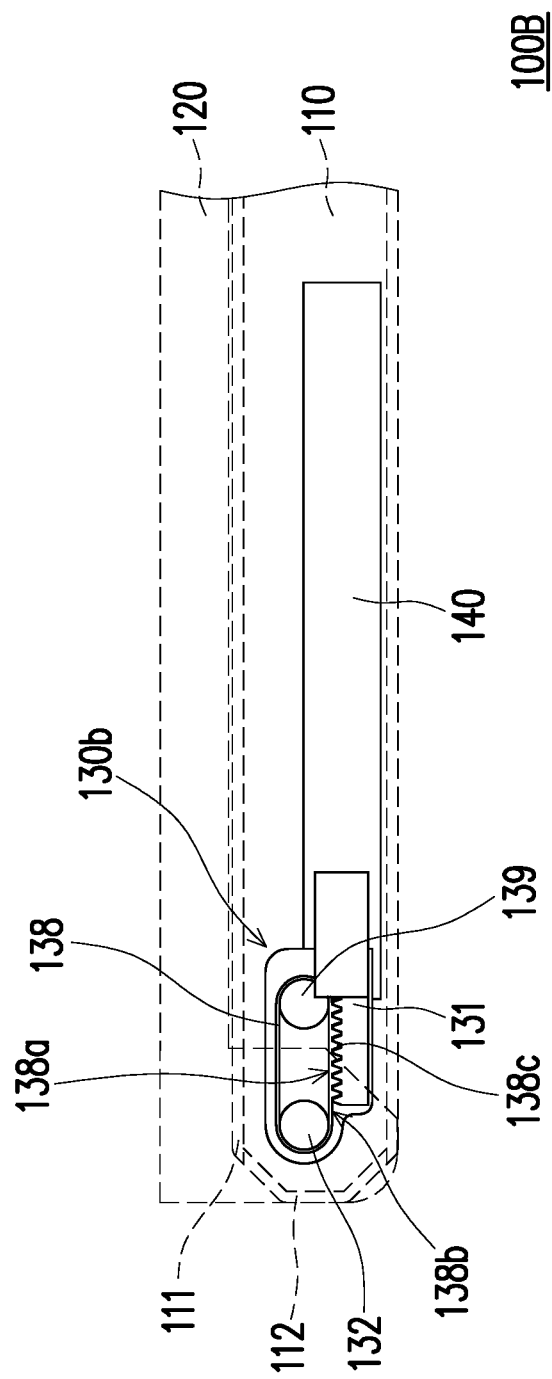
FIG. 3A is a schematic partial enlarged side view of a portable electronic device in a closed state according to the third embodiment of the disclosure.
Figure 3B:
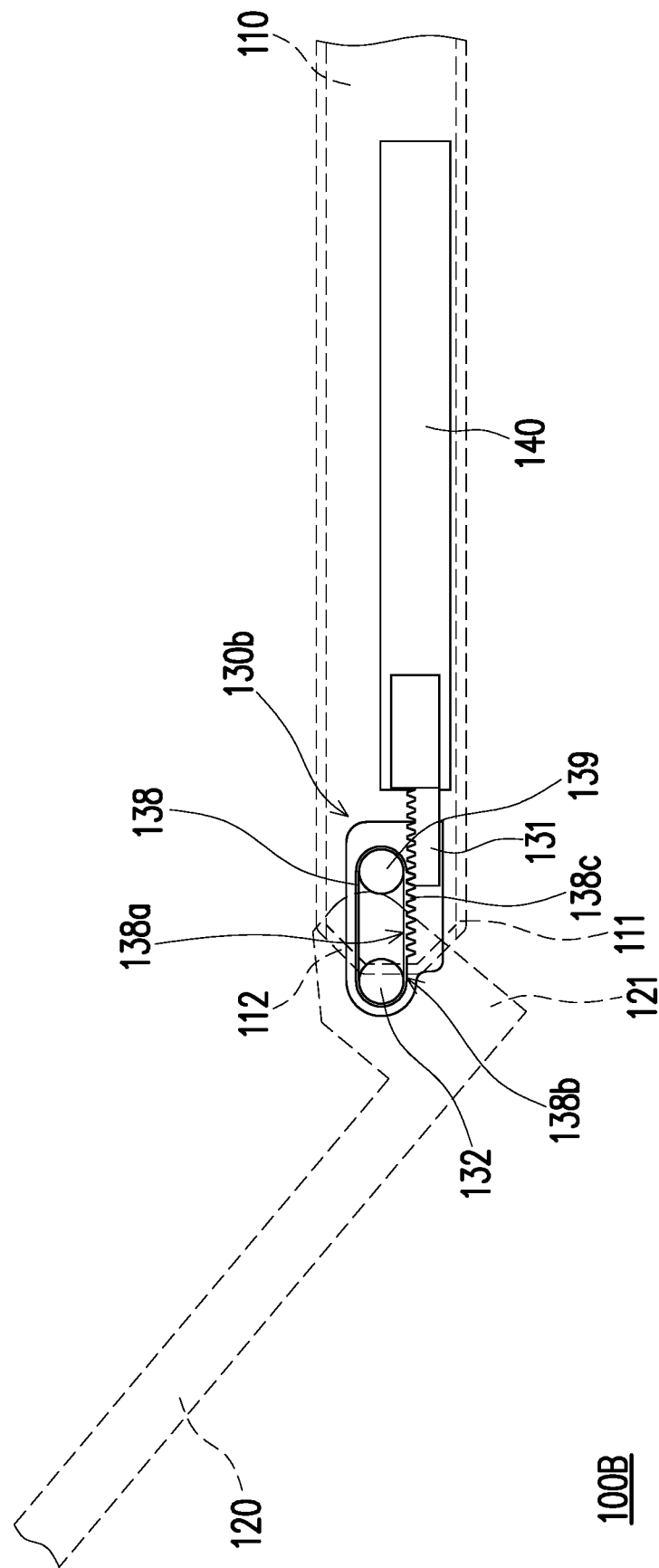
FIG. 3B is a schematic partial enlarged side view of a portable electronic device in an open state according to the third embodiment of the disclosure.

FIG. 3A is a schematic partial enlarged side view of a portable electronic device in a closed state according to the third embodiment of the disclosure. FIG. 3B is a schematic partial enlarged side view of a portable electronic device in an open state according to the third embodiment of the disclosure. In particular, the first body 110 and the second body 120 are shown in dashed lines in the drawings to clearly show an internal structure configuration of the first body 110 and the second body 120.

Referring to FIG. 3A and FIG. 3B, a design principle of a portable electronic device 100B of this embodiment is similar to a design principle of the portable electronic device 100 of the first embodiment, and a main difference between the two is a structure type of the actuator. In the embodiment, the actuator includes a toothed belt 138. The toothed belt 138 has an inner surface 138*a* contacting the rotation shaft 132, an outer surface 138*b* with respect to the inner surface 138*a*, and a plurality of actuation teeth 138*c* protruding from the outer surface 138*b*, and the plurality of actuation teeth 138*c* are engaged with the rack 131.

When the second body 120 rotates and opens with respect to the first body 110 through a hinge mechanism 130*b*, the rotation shaft 132 drives the toothed belt 138 to rotate or roll. Because the rack 131 is fixed, the rotating or rolling toothed belt 138 slides with respect to the rack 131 and drives the rotation shaft 132 to synchronously slide with the second body 120.

Following the above, driven by the hinge mechanism 130*b*, the second body 120 slides with respect to the first body 110, and slides away from the pivot side 111 of the first body 110 and the heat dissipation hole 112 located on the pivot side 111, so as to increase the distance between the lower edge 121 of the second body 120 and the heat dissipation hole 112. By increasing the distance between the lower edge 121 of the second body 120 and the heat dissipation hole 112, the heat dissipation hole 112 is not blocked by the lower edge 121 of the second body 120, so that the heat in the first body 110 can be quickly exhausted through the heat dissipation hole 112, so the portable electronic device 100B has excellent heat dissipation efficiency.

In the embodiment, the hinge mechanism 130*b* further includes a driven shaft 139 pivotally disposed in the second body 120, and the driven shaft 139 is aligned with the rotation shaft 132. The driven shaft 139 is parallel to the rotation shaft 132 and contacts the inner surface 138*a* of the toothed belt 138. The rotation shaft 132 and the driven shaft 139 serve to expand the toothed belt 138 so that the toothed belt 138 has sufficient tension, so as to prevent the toothed belt 138 from collapsing. In addition, the rotation shaft 132 drives the toothed belt 138 to rotate or roll, and the driven shaft 139 is driven by the toothed belt 138 to synchronously rotate.

Figure 4A:
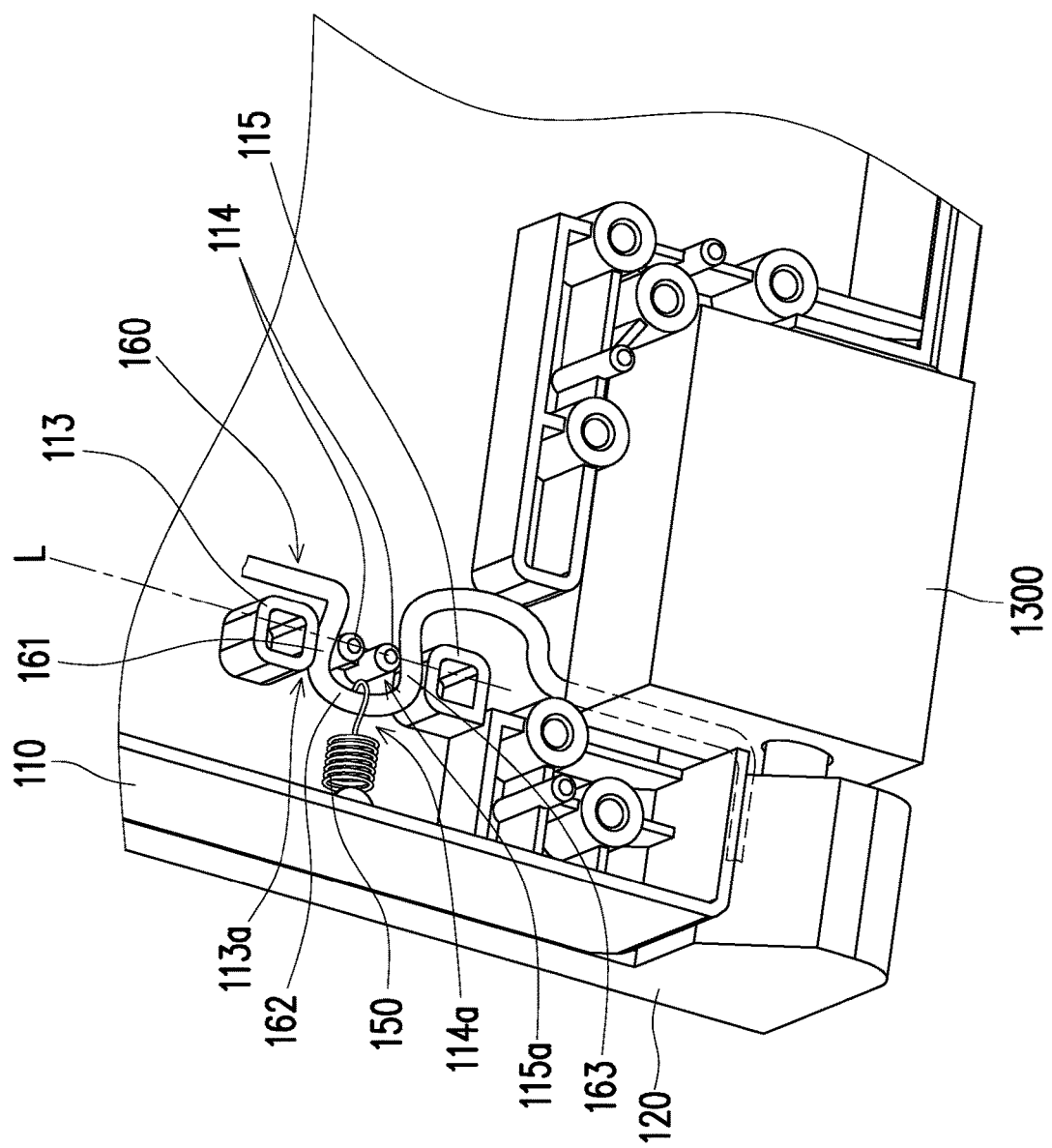
FIG. 4A is a schematic partial enlarged view of a portable electronic device in a closed state according to the fourth embodiment of the disclosure.
Figure 4B:
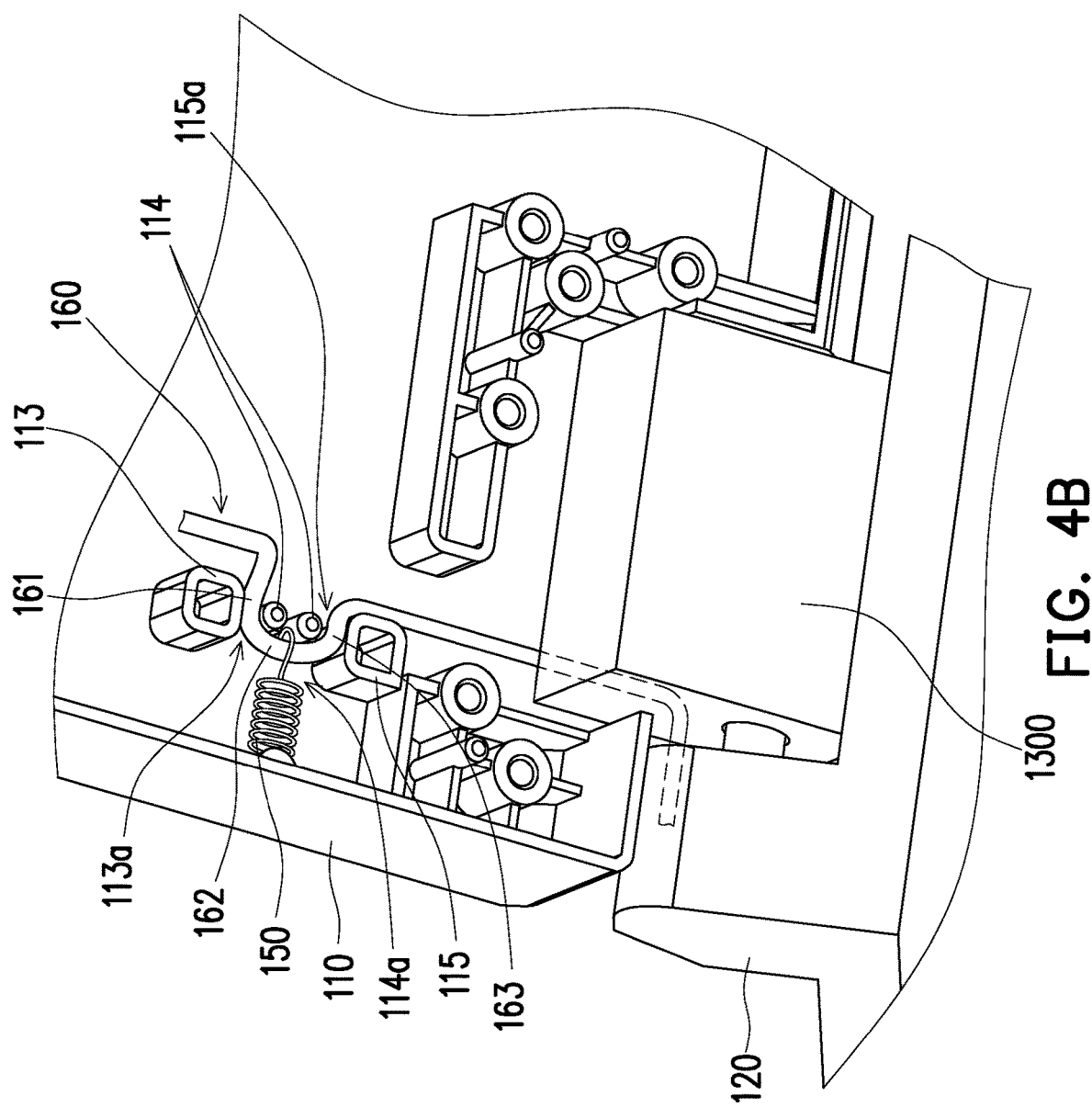
FIG. 4B is a schematic partial enlarged view of a portable electronic device in an open state according to the fourth embodiment of the disclosure.

FIG. 4A is a schematic partial enlarged view of a portable electronic device in a closed state according to the fourth embodiment of the disclosure. FIG. 4B is a schematic partial enlarged view of a portable electronic device in an open state according to the fourth embodiment of the disclosure. In particular, a lower case of the first body 110 is omitted in the drawings to clearly show an internal structure configuration of the first body 110.

Referring to FIG. 4A and FIG. 4B, a design principle of a portable electronic device 100C of this embodiment is similar to a design principle of the portable electronic device 100 of the first embodiment, the portable electronic device 100A of the second embodiment, or the portable electronic device 100B of the third embodiment, and the hinge mechanism 130 of the first embodiment, the hinge mechanism 130*a* of the second embodiment, or the hinge mechanism 130*b* of the third embodiment can be adopted for a hinge mechanism 1300 of the portable electronic device 100C. Therefore, at the time when the second body 120 rotates with respect to the first body 110 through the hinge mechanism 1300, the second body 120 slides with respect to the first body 110, and a horizontal displacement is generated.

Specifically, in the embodiment, the portable electronic device 100C further includes a spring 150 and a cable 160. The spring 150 is disposed in the first body 110, and the cable 160 extends from the first body 110 to the second body 120 through the hinge mechanism 1300. The second body 120 is electrically connected to the first body 110 through the cable 160 to receive power or signals from the first body 110. In addition, one end of the spring 150 is connected to the first body 110, and the other end of the spring 150 is connected to the cable 160. When the second body 120 rotates and slides with respect to the first body 110, the cable 160 is pulled and thereby expands and contracts.

Following the above, the spring 150 may be an expansion spring. When the portable electronic device 100C is in the closed state as shown in FIG. 4A, the cable 160 is not pulled, and the spring 150 is not elastically deformed (or the spring 150 is not expanded). When the portable electronic device 100C switches from the closed state as shown in FIG. 4A to the open state as shown in FIG. 4B, the cable 160 is pulled and thereby stretches, and the spring 150 is driven by the cable 160 to be elastically deformed (or the spring 150 is expanded). When the portable electronic device 100C switches from the open state as shown in FIG. 4B to the closed state as shown in FIG. 4A, an elastic restoring force of the spring 150 can drive the cable 160 to retract. That is to say, the spring 150 provides proper elasticity to the cable 160 to maintain the tension of the cable 160, so that the cable 160 can automatically adjust the expanding and contracting length with the opening and closing of the second body 120 with respect to the first body 110.

Keep referring to FIG. 4A and FIG. 4B, in the embodiment, the first body 110 has a first pillar 113, a second pillar 114, and a third pillar 115, and the second pillar 114 is located between the first pillar 113 and the third pillar 115. The first pillar 113, the second pillar 114, and the third pillar 115 define a winding route of the cable 160 to prevent the problem of tangling when the cable 160 expands and contracts. That is to say, the spring 150, the first pillar 113, the second pillar 114, and the third pillar 115 form a cable management structure, and the cable management structure is disposed in the first body 110.

Furthermore, the spring 150 is disposed as corresponding to the second pillar 114, and the first pillar 113, the second pillar 114, and the third pillar 115 are located on a same side of the spring 150. For example, the first pillar 113, the second pillar 114, and the third pillar 115 are arranged on a straight line L, and an extending direction of the spring 150 can be perpendicular to the straight line L. In other embodiments, a line between the first pillar 113 and the second pillar 114, a line between the first pillar 113 and the third pillar 115, and a line between the second pillar 114 and the third pillar 115 can form a triangle.

In the embodiment, the cable 160 includes a first winding segment 161, a second winding segment 162 connected to the first winding segment 161, and a third winding segment 163 connected to the second winding segment 162, and the first winding segment 161 extends through a first gap 113a between the first pillar 113 and the second pillar 114. In addition, the second winding segment 162 extends through a second gap 114a between the second pillar 114 and the spring 150, and the third winding segment 163 extends through a third gap 115a between the second pillar 114 and the third pillar 115. The second gap 114a is located between the first gap 113a and the third gap 115a, and the first gap 113a, the second gap 114a, and the third gap 115a form a winding route of the cable 160.

In detail, the cable 160 extends toward a direction of the second body 120 in the first winding segment 161, and turns after extending through the first pillar 113, and then extends through the first gap 113a. The cable 160 turns into the second winding segment 162 after extending through the first gap 113a, and extends toward the direction of the second body 120, and then extends through the second gap 114a. The cable 160 turns into the third winding segment 163 after extending through the second gap 114a, and then extends through the third gap 115a. The cable 160 turns after extending through the third gap 115a, and extends toward the direction of the second body 120.

Since the spring 150 is disposed as corresponding to the second pillar 114, two ends of the spring 150 are respectively connected to the first body 110 and the second winding segment 162. In the state as shown in FIG. 4A, the second winding segment 162 is farther away from the second pillar 114. In the state as shown in FIG. 4B, the cable 160 is pulled and thereby stretches, and the second winding segment 162 moves closer to the second pillar 114. Furthermore, the first pillar 113, the second pillar 114, and the third pillar 115 can generate a positioning effect to a reserved expanding and contracting segment of the cable 160 (i.e., the first winding segment 161, the second winding segment 162, and the third winding segment 163), and prevent the problem of tangling by a restriction of the winding route when the cable 160 expands and contracts. For example, the winding route may be a C-shaped route, so the first winding segment 161, the second winding segment 162, and the third winding segment 163 substantially show a C-shaped structure.

In summary of the above, in the portable electronic device of the disclosure, a cable management structure is disposed in the first body. The cable management structure includes the spring and the plurality of pillars, and the plurality of pillars define the winding route of the cable to prevent the problem of tangling when the cable expands and contracts. In addition, the spring provides proper elasticity to the cable to maintain the tension of the cable, so that the cable can automatically adjust the expanding and contracting length with the opening and closing of the second body with respect to the first body.

In addition, when the second body rotates and opens with respect to the first body through the hinge mechanism, the second body slides with respect to the first body, and slides away from the pivot side of the first body and the heat dissipation hole located on the pivot side, so as to increase the distance between the lower edge of the second body and the heat dissipation hole. By increasing the distance between the lower edge of the second body and the heat dissipation hole, the heat dissipation hole is not blocked by the lower edge of the second body, so that the heat in the first body can be quickly exhausted through the heat dissipation hole, so the portable electronic device of the disclosure has excellent heat dissipation efficiency.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A portable electronic device, comprising:
a first body, comprising a pivot side and a heat dissipation hole located on the pivot side;
a second body;
a hinge mechanism, wherein the second body is rotatably and slidably connected to the first body through the hinge mechanism, wherein the hinge mechanism comprises a rack fixedly disposed in the first body as corresponding to the pivot side, a rotation shaft connected to the second body, and an actuator connected to the rotation shaft and mechanically coupled to the rack;
a cable extending from the first body to the second body; and
a cable management structure disposed in the first body, wherein the cable management structure has a winding route, and the cable extends along the winding route, the cable management structure comprises a spring, and two ends of the spring are respectively connected to the first body and the cable,
when the second body rotates and opens with respect to the first body through the hinge mechanism, the rotation shaft rotates with the second body, and the actuator rotates with the rotation shaft, and the actuator rotates and slides with respect to the rack and drives the second body to slide away from the pivot side, so as to increase a distance between the second body and the heat dissipation hole.

2. The portable electronic device according to claim 1, wherein the cable management structure further comprises a first pillar, a second pillar, and a third pillar, and the second pillar is located between the first pillar and the third pillar, the winding route is at least defined by the first pillar, the second pillar and the third pillar.

3. The portable electronic device according to claim 2, wherein the spring disposed in the first body as corresponding to the second pillar, and the winding route is at least formed by a first gap between the first pillar and the second pillar, a second gap between the second pillar and the spring and a third gap between the second pillar and the third pillar.

4. The portable electronic device according to claim 3, wherein the cable comprises a first winding segment, a second winding segment connected to the first winding segment and a third winding segment connected to the second winding segment, the first winding segment extends through the first gap, the second winding segment extends through the second gap and is connected to the spring, the third winding segment extends through the third gap.

5. The portable electronic device according to claim 4, wherein the first winding segment, the second winding segment, and the third winding segment show a C-shaped structure.

6. The portable electronic device according to claim 3, wherein the winding route shows a C-shaped route.

7. The portable electronic device according to claim 2, wherein the first pillar, the second pillar, and the third pillar are arranged on a straight line.

8. The portable electronic device according to claim 2, wherein the first pillar, the second pillar, and the third pillar are located on a same side of the spring.

9. The portable electronic device according to claim 1, wherein the spring is an expansion spring.

10. The portable electronic device according to claim 1, wherein the actuator comprises a first spur gear, a second spur gear, and a third spur gear, and
the first spur gear is connected to the rotation shaft, the first spur gear is engaged with the second spur gear, the second spur gear is engaged with the third spur gear, and the third spur gear is engaged with the rack.

11. The portable electronic device according to claim 10, wherein the rotation shaft, the first spur gear, the second spur gear, and the third spur gear synchronously slide with the second body.

12. The portable electronic device according to claim 10, wherein rotation axes of the rotation shaft, the first spur gear, the second spur gear, and the third spur gear are parallel to each other.

13. The portable electronic device according to claim 1, wherein the actuator comprises a first helical gear, a second helical gear, a third helical gear, a synchronous spur gear, and a driven spur gear, and
the first helical gear is connected to the rotation shaft, and the first helical gear is engaged with the second helical gear,
wherein the second helical gear is engaged with the third helical gear, the synchronous spur gear is fixedly disposed on the third helical gear, the synchronous spur gear is engaged with the driven spur gear, and the driven spur gear is engaged with the rack.

14. The portable electronic device according to claim 13, wherein the rotation shaft, the first helical gear, the second helical gear, the third helical gear, the synchronous spur gear, and the driven spur gear synchronously slide with the second body.

15. The portable electronic device according to claim 13, wherein rotation axes of the rotation shaft and the first helical gear are not parallel to rotation axes of the second helical gear, the third helical gear, the synchronous spur gear, and the driven spur gear, and
the rotation axes of the second helical gear, the third helical gear, the synchronous spur gear, and the driven spur gear are parallel to each other.

16. The portable electronic device according to claim 1, wherein the actuator comprises a toothed belt,
the toothed belt comprises an inner surface contacting the rotation shaft, an outer surface with respect to the inner surface, and a plurality of actuation teeth protruding from the outer surface, and
the plurality of actuation teeth are engaged with the rack.

17. The portable electronic device according to claim 16, wherein the rotation shaft and the toothed belt synchronously slide with the second body.

18. The portable electronic device according to claim 16, wherein the hinge mechanism further comprises a driven shaft pivotally disposed in the second body,
the driven shaft is aligned with the rotation shaft, and
the inner surface of the toothed belt contacts the driven shaft.

* * * * *

UNITED STATES PATENT AND TRADEMARK OFFICE
CERTIFICATE OF CORRECTION

PATENT NO. : 11,775,030 B2
APPLICATION NO. : 17/938961
DATED : October 3, 2023
INVENTOR(S) : Pao-Min Huang et al.

Page 1 of 1

It is certified that error appears in the above-identified patent and that said Letters Patent is hereby corrected as shown below:

On the Title Page

Item (30) please add:
Foreign Application Priority Data: January 14, 2021 (TW) ......110101421

Signed and Sealed this
Eleventh Day of February, 2025

Coke Morgan Stewart
*Acting Director of the United States Patent and Trademark Office*